United States Patent Office 3,013,549
Patented Dec. 19, 1961

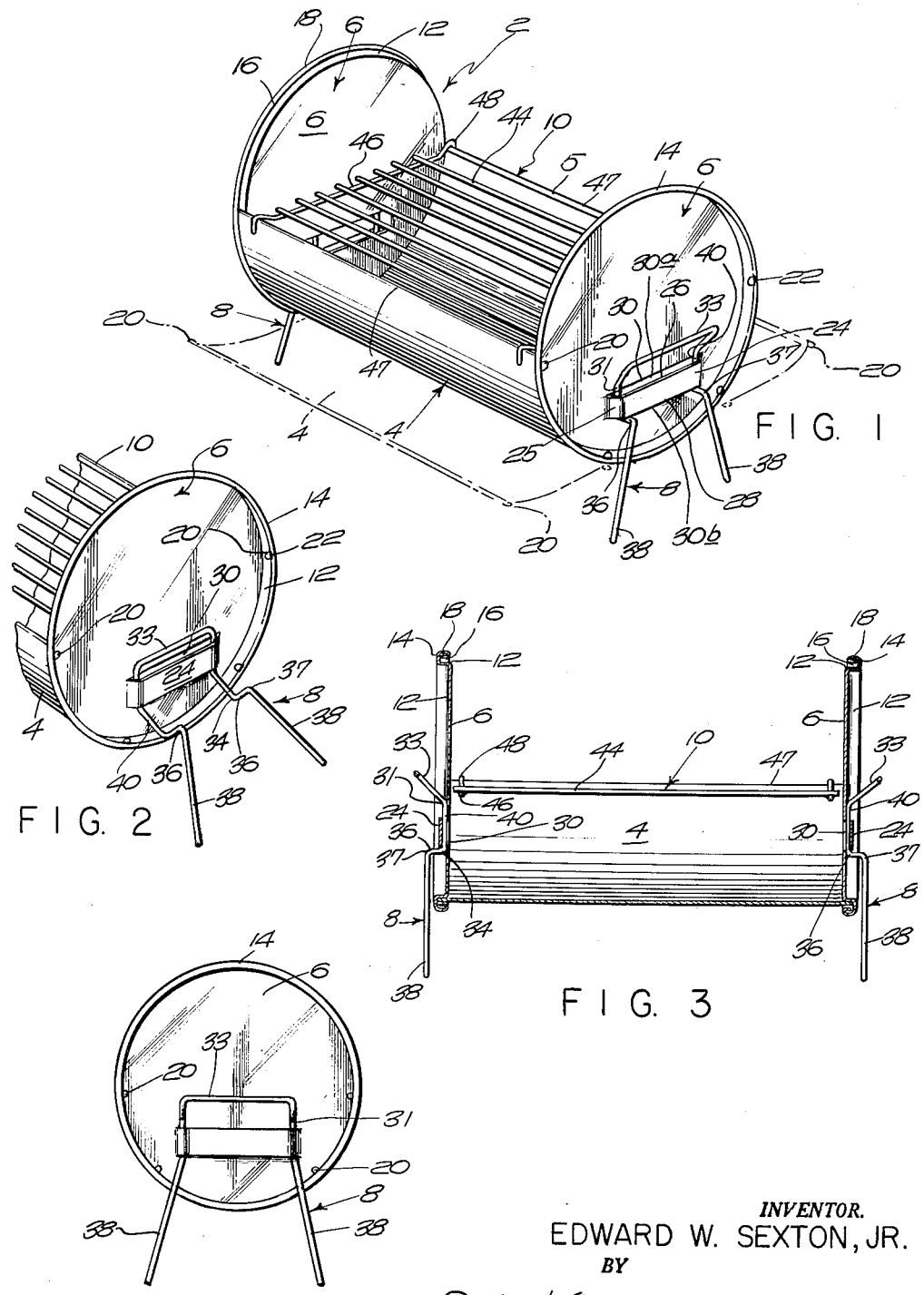

3,013,549
PORTABLE OUTDOOR COOKER
Edward W. Sexton, Jr., Cambridge, Mass., assignor to Sexton Can Company, Inc., Everett, Mass., a corporation of Massachusetts
Filed Mar. 16, 1960, Ser. No. 15,334
7 Claims. (Cl. 126—25)

An object of the invention is to provide such an outdoor cooker which is so inexpensive that it can be given to customers free of charge as a part of sales or advertising programs to build up good will, which is so simple in construction and to assemble that it can be sold or given away as a small, compact, relatively flat, easy-to-store, unassembled package for assembly in a matter of a few seconds by the most unintelligent user without the necessity of tools of any kind, which can be easily disassembled into such a package when not in use and without the necessity of tools, whereby it can be stored and transported in relatively small compact space, in which sharp edges have been kept to a minimum to avoid danger of the user cutting himself during assembly, use and disassembly, and which consists of only three pieces of sheet metal which can be inexpensively stamped out of flat sheet stock to the proper size and contour, two pieces of wire and a small grill.

Another object is to provide an outdoor cooker having a novel combined handle and supporting leg member which functions simultaneously as a handle for carrying the cooker and as legs for firmly supporting the cooker above a supporting surface and which is adapted to be detachably secured to the grill merely by sliding it into and out of place, the member being so contoured that when it is slid into place, the cooker is locked thereto. The combined handle and legs may be easily removed from the cooker intentionally by a simple sliding movement but cannot be removed accidentally.

The three sheet metal pieces may be assembled merely by inserting tabs into apertures and bending the tabs over, whereafter the two pieces of wire forming the combined handle and supporting legs may be slid into place and the grill placed on the cooker to complete the assembly.

Further objects and advantages will be apparent from the following description and the accompanying drawings in which FIG. 1 is a view in perspective of an embodiment of the assembled outdoor cooker of the present invention with the pan for holding the fuel being shown in disassembled form in phantom lines.

FIG. 2 is a view like FIG. 1 with a rear portion cut away and showing the cooker during assembly while a combined handle and leg member is being secured to the cooker.

FIG. 3 is a section in elevation of the cooker of FIG. 1.

FIG. 4 is an end view of the cooker of FIG. 1.

In the drawings, 2 represents an outdoor cooker embodying the invention. It comprises (1) a fuel-holding pan 4 made of a rectangular piece of flat sheet metal (shown in phantom lines in FIG. 1) bent into the shape of a half cylinder open at the top, the upper longitudinal edges of such open half cylinder being bent back on themselves at 5 to avoid sharp edges, (2) a pair of end walls 6 comprising circular discs of sheet metal detachably secured to the ends of pan 4, (3) a pair of generally U-shaped wires 8 each of which is detachably secured to an end wall 6 and comprises a combined handle to carry the outdoor cooker and legs to support the cooker above the ground, and (4) a grill 10 over the open top of the pan 4.

Each of the discs 6 has a peripheral, cylindrical flange 12 extending outwardly from the peripheral edge thereof, such flange being bent back on itself at 14 to form an annular channel 16 and being curled inwardly at its end at 18 to eliminate sharp edges and hence avoid any danger of the user cutting himself. The opposite end portions of pan 4 are bent around the lower halves of the flanges 12 to force the pan into the shape of a half cylinder open at the top, as shown, and are detachably secured to the discs in such shape by four spaced tabs 20 which extend from the opposite end edges of the pan 4 into elongated apertures 22 in the bends 14.

The lower half of each end disc 6 is struck out at 24 to form a band or strap 24, the ends 25 of which are integral with the disc proper and the upper and lower edges 26 and 28 of which are separated and spaced from the disc proper, as shown, to form a vertically extending opening 30 open at the top 30a and at the bottom 30b.

A U-shaped member 8 made of heavy wire is received in each opening 30. The upper base portion of each member 8 is bent outwardly at 31 at an angle of about 45 degrees from the plane of the legs of the U to form a handle 33. The legs of the U are bent outwardly from such plane at 34 at an angle of about 90 degrees to form a shoulder 36 and are then bent downwardly at 37 into end portions 38 which flare outwardly from each other to form legs for supporting the cooker above the ground. The straight intermediate portions 40 of the U-legs of each member 8 between the bends 31 and 34 are received in opening 30 of each disc 6 and extend vertically above the opening 30 into the handle portion 33 and below the opening into shoulders 36 and leg portions 38. The intermediate portions 40 of the U-legs lie in a plane which is substantially parallel to the plane of the disc 6. End portions 38 also preferably lie in a plane which is substantially parallel to the plane of the disc 6 and to the plane in which intermediate portions 40 lie. The plane in which these intermediate portions 40 lie may be considered the plane of the legs of the U from which the handle portion 33 and the supporting leg portions 38 are bent outwardly at 31 and 36 respectively. The length of the intermediate portions 40 is greater than the vertical width or height of the band 24. The lower edge 28 of the band 24 rests on and is supported by the shoulders 36 of the U-shaped member 8. The lower ends of the intermediate portions 40 where they bend into the shoulders 36 are held tightly against the outer surface of the end wall 6 adjacent the lower end of the opening 30 and the upper ends of such intermediate portions 40 are held tightly against the end wall 6 adjacent the upper end of the opening 30 by the band 24. Since the lower edge 28 of the band 24 rests on the shoulder 36 and the length of the intermediate portions 40 is substantially greater than the vertical height of band 24, a substantial part of the intermediate portions 40 extend upwardly above the opening 30 and along the outer surface of end wall 6 before they bend outwardly into the handle portion 33. The diameter of the U-legs is preferably about the same as the distance which the band 24 is displaced from the disc proper so that the intermediate portions 40 fit snugly between the band 24 and the outer surface of disc 6 adjacent to the top and bottom of the opening 30. The U-legs forming intermediate portions 40 flare outwardly from each other slightly from bend 31 to bend 34 before the U member is inserted in the band 24. The ends 25 of the band force them (portions 40) together into substantially parallel relationship with each other when the U member is located in the opening 30, as shown in FIGS. 1 and 4, so that portions 40, especially the lower portions thereof adjacent bend 34, fit snugly between and press outwardly against the ends 25 of band 24, as shown, when the U member is located in the opening 30.

The grill 10 is made up of parallel rods 44 secured together by a pair of cross rods 46 secured to rods 44 by soldering or welding. Grill 10 is located over the open top of the pan 4. It is supported on the upper longitudinal edges 47 of the pan 4 by hooks 48 at the ends of cross rods 46, the longitudinal upper edges 47 of the pan being received in the hooks.

The outdoor cooker of the present invention can be easily and quickly assembled from the flexible, flat, sheet metal pan piece 4 shown in phantom lines in FIG. 1, discs 6 and U wires 8 by bending the pan piece around the lower halves of the cylindrical flanges 12 of discs 6 and securing it in such position by the tabs 20 and apertures 22. Thereafter, the U wires 8 are securely locked to the discs 6 by inserting the handle portion 33 into and through the opening 30, such handle portion 33 being first moved through the lower end 30b and then through the upper end 30a of the opening 30. The movement of the U member through the opening is continued until the top of the handle portion moves out of 30a sufficiently to grasp it by the hand, as shown in FIG. 2, and pull it through the opening until the intermediate portions 40 are received in the opening 30 and the lower edge 28 of the band 24 engages the shoulders 36, in which position the portions 40 are securely and tightly clamped between the band 24 and the outer surface of the end wall 6 and between the ends 25 of the band 24. When leg portions 40 are pulled through opening 30, the ends 25 force the slightly flared leg portions 40 toward each other which causes such leg portions, especially the lower portions thereof, to press outwardly against ends 25. In moving the handle 33 and intermediate portions 40 through the opening 30, the U member turns in order to move the bend 31 through the opening. The intermediate portions 40 are made longer than the width or height of the band 24 to permit this movement of the bend 31 through the opening. In effect, the U wire is removably clipped to the end wall 6.

After the two U wires 8 are detachably secured to the end walls 6, the cooker is placed on the ground or some other supporting surface, as shown in FIG. 1, charcoal is placed in the pan 4 and ignited and the grill 10 is placed over the open top of the pan by placing the hooks 48 over the longitudinal upper edges of the pan. The grill is then ready for use.

The openings 30 not only clamp the U members to the end walls 6 but also serve as air flues or drafts to aid combustion.

The cooker may be easily disassembled by moving the intermediate portions 40 and handle 33 downwardly out of the opening 30. Thereafter, the pan 4 and end walls 6 can be separated from each other by removing tabs 20 of the pan from the apertures 22 in end walls 6 so that the entire unit can be stored in a relatively flat space in an auto or garage or even in a picnic basket or bag.

I claim:

1. An outdoor cooker comprising a pan, a pair of end walls to which said pan is secured and a pair of generally inverted U-shaped members detachably mounted on said end walls, each inverted U-shaped member comprising first portions forming a pair of legs for supporting said cooker above a supporting surface, a base portion spaced from said leg portions and forming a handle for lifting said cooker and a pair of mounting portions between said handle portion and said leg portions, said mounting portions comprising intermediate portions, connecting portions extending upwardly and outwardly from the upper ends of the intermediate portions to the ends of the handle portion, and shoulders extending outwardly from the lower portions of said intermediate portions to the upper portions of said legs, said end walls having mounting means cooperating with said mounting portions to removably mount the cooker to said inverted U-shaped members, said shoulders comprising supports for supporting said pan and end walls and said inverted U-shaped members being movable into and out of releasable interlocking relationship with said mounting means.

2. A cooker according to claim 1 wherein the legs of each pair of legs diverge away from each other as they extend downwardly.

3. A cooker according to claim 1 wherein said pairs of legs lie in planes which are substantially parallel to the planes of the end walls and to each other.

4. A cooker according to claim 1 wherein each said mounting means comprises a portion of an end wall which is displaced outwardly from the plane of the end wall to form a strap spaced outwardly from said end wall, at least one end of said strap being integral with said end wall and the upper and lower edges of said strap being spaced from said end wall to form an opening which is open at the top and the bottom, said intermediate portions of one of said inverted U-shaped members extending vertically through said opening and downwardly below the strap to the ends of said shoulders, said shoulders being located under and supporting the lower edge of said strap and said connecting portions extending upwardly above the strap into said handle portion.

5. A cooker according to claim 4 wherein the thickness of said intermediate portions is about the same as the distance which said strap is displaced from said end walls.

6. A cooker according to claim 4 wherein said connecting portions of said mounting portions extend away from said end wall at an angle of about 45°.

7. A cooker according to claim 4 wherein each of said inverted U-shaped members is removably secured to its end wall by inserting said handle portion through said opening to move said connecting portions of said mounting portions into the opening and upwardly and outwardly above said strap and said intermediate portions into said opening and behind said strap, said inverted U-shaped member being removable from said end wall by moving said handle and said connecting and intermediate portions through said opening in the opposite direction.

References Cited in the file of this patent

UNITED STATES PATENTS

| | | |
|---|---|---|
| D. 180,599 | Jacoby | July 9, 1957 |
| 931,557 | Barney | Aug. 17, 1909 |
| 2,080,109 | Brennan | May 11, 1937 |
| 2,306,467 | Reynolds | Dec. 29, 1942 |
| 2,573,211 | Manzler | Oct. 30, 1951 |
| 2,774,345 | Peplin | Dec. 18, 1956 |
| 2,820,446 | Freeman | Jan. 21, 1958 |
| 2,842,116 | Hinderer | July 8, 1958 |
| 2,902,026 | Hathorn | Sept. 1, 1959 |